United States Patent
Matsushita et al.

(10) Patent No.: US 8,914,077 B2
(45) Date of Patent: Dec. 16, 2014

(54) IN-VEHICLE APPARATUS

(75) Inventors: Suguru Matsushita, Obu (JP); Soichi Saito, Nagoya (JP); Ryuuji Sakata, Kariya (JP); Shinichi Yamamoto, Toyota (JP); Kazushige Hayashi, Toyota (JP); Masao Sasaki, Okazaki (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 658 days.

(21) Appl. No.: 13/200,171

(22) Filed: Sep. 20, 2011

(65) Prior Publication Data

US 2012/0071097 A1 Mar. 22, 2012

(30) Foreign Application Priority Data

Sep. 21, 2010 (JP) ................................ 2010-210724

(51) Int. Cl.
*H04W 8/00* (2009.01)
*H04M 1/60* (2006.01)
*H04W 76/00* (2009.01)

(52) U.S. Cl.
CPC ........ *H04M 1/6091* (2013.01); *H04M 2250/02* (2013.01); *H04W 8/005* (2013.01); *H04W 76/00* (2013.01)
USPC ...... 455/569.2; 455/41.1; 455/41.2; 455/41.3

(58) Field of Classification Search
CPC .................................................. H04B 1/3822
USPC ....................................................... 455/569.2
See application file for complete search history.

(56) References Cited

U.S. PATENT DOCUMENTS

| | | | |
|---|---|---|---|
| 2005/0070336 A1* | 3/2005 | Tamura | 455/567 |
| 2008/0051156 A1 | 2/2008 | Matsuda | |
| 2008/0051158 A1 | 2/2008 | Male et al. | |
| 2008/0280655 A1 | 11/2008 | Ozaki | |

(Continued)

FOREIGN PATENT DOCUMENTS

| | | |
|---|---|---|
| DE | 10 2010 001 944 | 8/2010 |
| DE | 10 2010 001 946 | 8/2010 |

(Continued)

OTHER PUBLICATIONS

Office Action dated Mar. 12, 2014 in corresponding Chinese Application No. 2011 10290742.9.

(Continued)

*Primary Examiner* — Wen Huang
(74) *Attorney, Agent, or Firm* — Harness, Dickey & Pierce, PLC

(57) ABSTRACT

A control circuit of an the in-vehicle apparatus repeatedly performs a Bluetooth connection operation to connect to both of registered cellular phones and registered portable AV players in such a manner that, if an HFP connection has already been established to a cellular phone prior to an AVP connection to a portable AV player, the control circuit performs one round of AVP connection attempts to all of the registered portable AV players according to a priority order, prior to performing connection attempts to connect other data communication type profile to the cellular phone. By using such a profile connection scheme, the AVP connection attempt will not be delayed until after a connection attempt of the other data communication type profile.

5 Claims, 3 Drawing Sheets

(56) References Cited

U.S. PATENT DOCUMENTS

| | | |
|---|---|---|
| 2009/0061769 A1* | 3/2009 | Zimbric et al. ............... 455/41.2 |
| 2009/0280746 A1* | 11/2009 | Sykora et al. ................ 455/41.3 |
| 2010/0062714 A1* | 3/2010 | Ozaki ........................... 455/41.3 |
| 2010/0210316 A1 | 8/2010 | Okayasu |
| 2010/0210317 A1 | 8/2010 | Kakehi |
| 2011/0250920 A1 | 10/2011 | Shimizu et al. |
| 2012/0071096 A1 | 3/2012 | Matsushita |

FOREIGN PATENT DOCUMENTS

| | | |
|---|---|---|
| JP | 2007-281652 | 10/2007 |
| JP | 2008-160646 | 7/2008 |
| JP | 2008-278172 | 11/2008 |
| JP | 2009-081824 | 4/2009 |
| WO | WO 2009/032571 | 3/2009 |
| WO | WO2010/041412 | 4/2010 |

OTHER PUBLICATIONS

Office Action issued Nov. 19, 2013 in corresponding JP Application No. 2010-210724 (with English translation).

Examination Report dated Nov. 28, 2013 in corresponding German Application No. 102011082889.3.

Office Action issued Aug. 1, 2013 in corresponding CN Application No. 201110290742.9 (with English translation).

Office Action dated May 7, 2012 in corresponding German Application No. 10 2011 082889.3 (with English translation).

Office Action dated Aug. 4, 2014 issued in the corresponding CN application No. 201110290742.9.

* cited by examiner

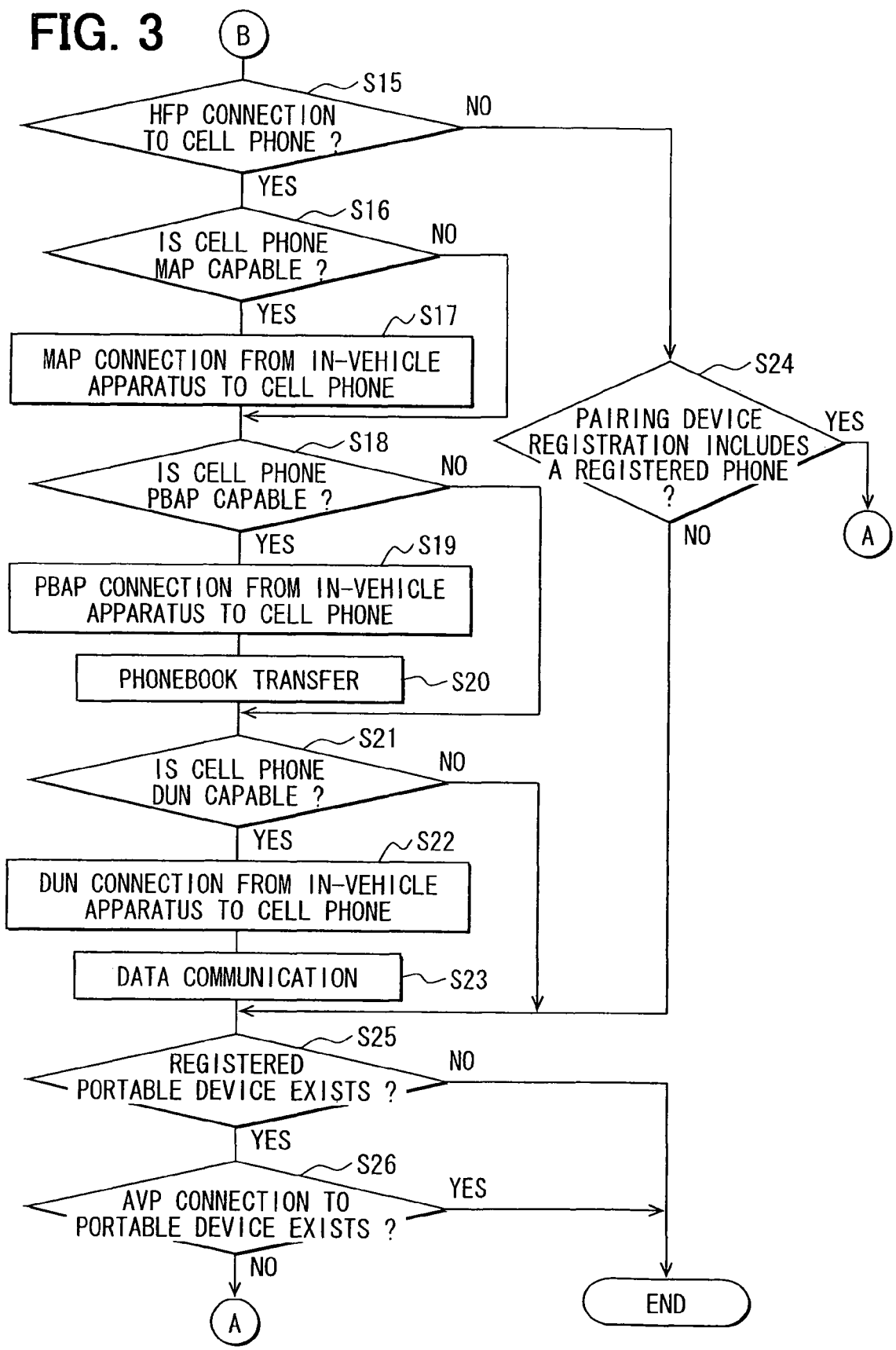

IN-VEHICLE APPARATUS

CROSS REFERENCE TO RELATED APPLICATION

The present application is based on and claims the benefit of priority of Japanese Patent Application No. 2010-210724, filed on Sep. 21, 2010, the disclosure of which is incorporated herein by reference.

FIELD OF THE INVENTION

The present invention generally relates to an in-vehicle apparatus establishing a short range wireless communication by Bluetooth standard to an HFP type device and an AVP type device.

BACKGROUND INFORMATION

"Bluetooth," which is a type of short range wireless communication protocol, establishes a connection between two devices through multiple profiles (i.e. Multi-Profiles). Such multi-profiles established situation may also arise when a host Bluetooth device communicates with each multiple devices, such as HFP type devices and AVP type devices (i.e., Point to Multi-Points).

In patent document JP-A-2008-278172 (US2008/0280655A1), an operation scheme of an in-vehicle apparatus is disclosed. Specifically, when a cellular phone is equipped with portable functions, such as a music player, the in-vehicle apparatus establishes a hands-free profile (HFP) connection with the cellular phone, and then asks a user whether the additional portable function of the cellular phone should be registered. If the user requests registration of the portable function the in-vehicle apparatus establishes the proper connection profile to the cellular phone. For example, for portable function of playing music, the in vehicle apparatus would establish an audio video profile (AVP) connection to the cellular phone.

Further, in patent document JP-A-2007-281652, an operation scheme of an in-vehicle apparatus is disclosed, in which, after an establishment of an HFP connection between the in-vehicle apparatus and a cellular phone, it is determined whether the cellular phone is capable of handling multiple profiles by serially determining (a) whether it is possible to establish a dial-up networking profile (DUN) link therebetween, and (b) whether it is possible to establish an AVP connection therebetween.

In the above-described situation, after the connection of an HFP type device prior to an AVP type device, a connection establishment process to connect a data communication type profile other than an AVP is performed in a prioritized manner. As a result, the connection of the AVP type device by the AVP of Bluetooth is postponed until after the connection establishment of the data communication type profile, and the start of music playback by the AVP connection is delayed. In other words, contrary to a user's expectation that music playback should be immediately started by, for example, the Bluetooth (AVP) connection to a music player (i.e., either of a music-playable cellular phone or a portable device dedicated for music playback) after getting into the vehicle, the music playback through the Bluetooth (AVP) connection takes a long time before starting.

SUMMARY OF THE INVENTION

In view of the above and other problems, the present disclosure provides an in-vehicle apparatus that is capable of reducing a wait time to the start of music playback by an AVP type device, even when a connection to an HFP type device is established prior to a connection to the AVP type device, by controlling a Bluetooth profile connection scheme for establishing a connection of multiple profiles from the in-vehicle apparatus to various devices.

In view of the above and other problems, the present disclosure provides an in-vehicle apparatus that is capable of reducing a wait time to the start of music playback by an AVP type device, even when a connection to an HFP type device is established prior to a connection to the AVP type device, by controlling a Bluetooth profile connection scheme for establishing a connection of multiple profiles from the in-vehicle apparatus to various devices.

An in-vehicle apparatus which is capable of establishing a Bluetooth connection to pre-registered multiple devices, the apparatus comprising: a priority order setting unit that determines an order of priority of a plurality of multiple-device connection profiles of the Bluetooth connection; and a connection unit that connects the plurality of multiple-device connection profiles to the pre-registered multiple devices according to the order of priority of the plurality of multiple-device connection profiles.

The connection unit includes a first sub-unit that performs a connection attempt to establish a connection of a first profile from among the plurality of multiple-device connection profiles to the multiple devices; and a second sub-unit that performs a connection attempt to establish a connection of a second profile from among the plurality of multiple-device connection profiles, which is different from the first profile, to the multiple devices. Where after successfully establishing a connection of the first profile to a first device from among the multiple devices by the first sub-unit, the connection unit uses the second sub-unit for performing the connection attempt to establish a connection of the second profile to the multiple devices, without continuing to perform a connection attempt by the first sub-unit.

The in-vehicle apparatus also includes a connection operation controller. Where the first sub-unit establishes an HFP connection to an HFP type device to put the HFP type device in a call waiting condition, The second sub-unit establishes an AVP connection to an AVP type device to enable a playback by the AVP type device, and the connection unit includes a third sub-unit for connecting a data communication type profile to the HFP type device. When the first sub-unit is connected prior to the connection of the second sub-unit after repeated operations of the first and second sub-units, the connection operation controller operates the second sub-unit before operating the third sub-unit.

The in-vehicle apparatus further includes a registration unit that contains registration of a device that is connected to the connection operation controller at a time of previous power supply turn-off. Wherein the connection operation controller prioritizes the Bluetooth connection of the device that has the registration in the registration unit when the connection operation controller operates the second sub-unit.

BRIEF DESCRIPTION OF THE DRAWINGS

Objects, features, and advantages of the present disclosure will become more apparent from the following detailed description made with reference to the accompanying drawings, in which:

FIG. 3 is a continuation of the flowchart of the connection operation of FIG. 2.

DETAILED DESCRIPTION

Figure 1:
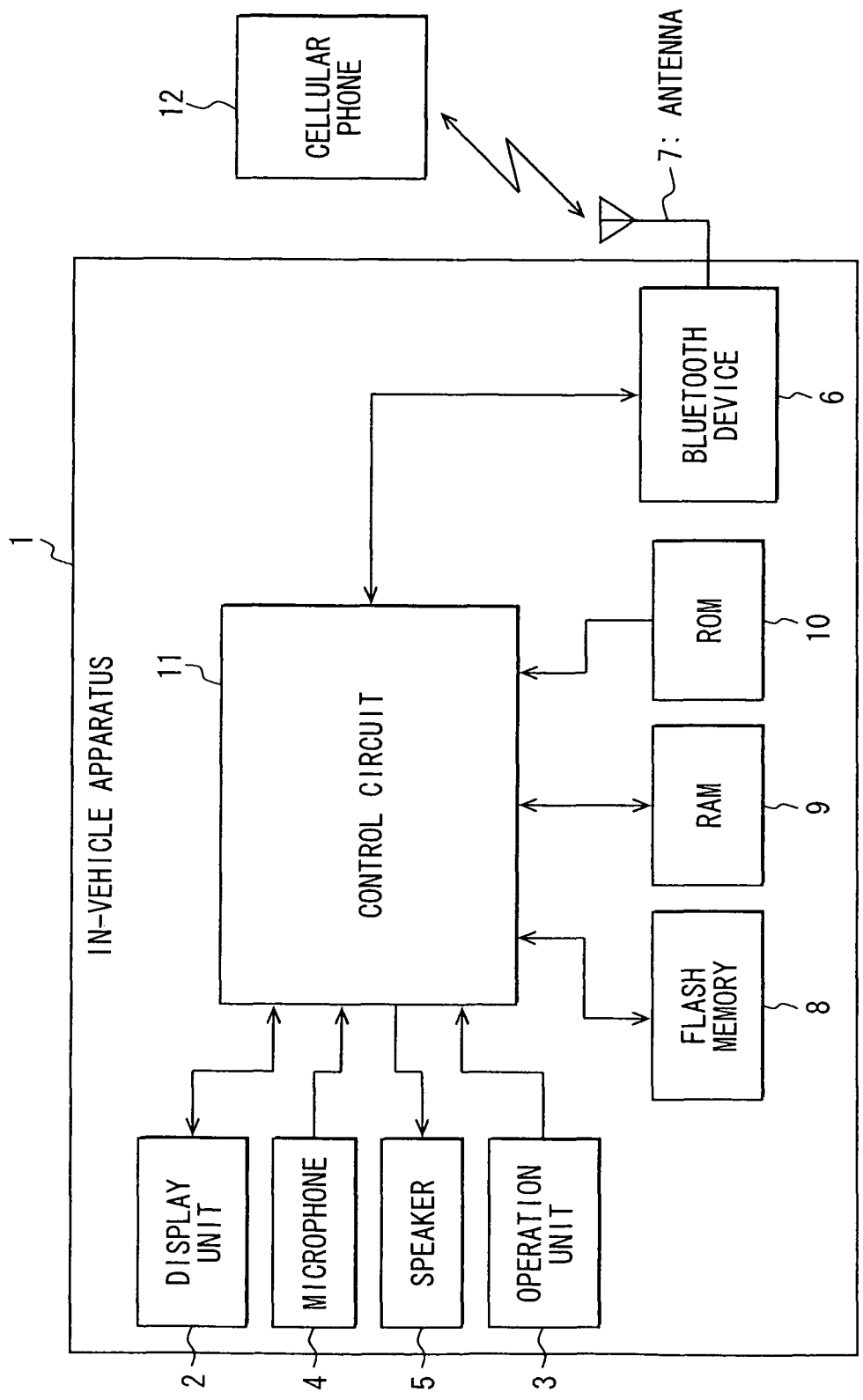
FIG. 1 is a block diagram of an in-vehicle apparatus in one embodiment of the present invention.

The present invention is explained in the following, with reference to the drawing.

With reference to FIG. 1, an in-vehicle apparatus 1 includes a display unit 2, an operation unit 3, a microphone 4, a speaker 5, a Bluetooth device 6, an antenna 7, a flash memory 8, a RAM 9, a ROM 10, and a control circuit 11 having a CPU as its main component, for realizing a hands-free function.

The display unit 2 may be a liquid crystal display, and displays text data and/or image data input from the control circuit 11. The operation unit 3 is a mechanical switch or a touch panel, and outputs a signal based on a user operation to the control circuit 11. The operation unit 3 is equivalent to a priority order setting unit, a connection unit, a first sub-unit, a second sub-unit, a third sub-unit, a connection operation controller, and a registration unit in claims. The microphone 4 converts the sound that a user has uttered into a voice signal, and outputs the signal to the control circuit 11. The speaker 5 outputs, as a sound, a voice signal input from the control circuit 11.

The Bluetooth device 6 outputs data to the control circuit 11. The Bluetooth device 6 receives a signal from antenna 7, and based on the Bluetooth standard, the Bluetooth device 6 processes the signal by performing a frequency conversion, a demodulation, an amplification, and an A/D conversion. Additionally, the Bluetooth device 6 also outputs a signal that contains data from the control circuit 11 by D/A converting, amplifying, modulating, and frequency-converting the data from the control circuit 11. In the present embodiment, the Bluetooth device 6 is configured to connect to a cellular phone 12 (i.e., an HFP type device in claims), where the cellular phone includes a Bluetooth communication function for short range wireless communication.

The flash memory 8 is a re-writable, nonvolatile storage medium that stores various data, such as telephone book data showing a relationship between telephone numbers and corresponding personal names or the like.

The control circuit 11 retrieves, from the ROM 10, a program for the operation of the in-vehicle apparatus 1, and the retrieved program is executed by the control circuit 11. In the course of execution of the program, the data is written in the flash memory 8 or the RAM 9, and the data is retrieved from the flash memory 8, the RAM 9, or the ROM 10. In addition, in the course of operation, the control circuit 11 receives signal inputs from the operation unit 3, the microphone 4, and the Bluetooth device 6, and outputs a signal to the speaker 5 and the Bluetooth device 6.

The cellular phone 12, which connects to the in-vehicle apparatus 1 through Bluetooth connection, has a function to connect to the Bluetooth device 6, in addition to a normal cellular phone function. In addition, the cellular phone 12 includes an HFP function, and other functions such as a DUN function and the like defined in the Bluetooth standard.

The cellular phone 12 maybe categorized as a multi-profile handling type cellular phone or a multi-profile non-handling type cellular phone. The multi-profile handling type cellular phone (may be designated as a multi-profile type cellular phone hereinafter) is capable of handling simultaneous operations for multiple profiles, such as, HFP, DUN, and the like. The multi-profile non-handling type cellular phone is capable of handling only one operation at a time for one profile. In the present embodiment, the in-vehicle apparatus 1 is assumed to connect to the multi-profile type cellular phone. Therefore, in the following description, the cellular phone 12 is assumed to be a multi-profile type cellular phone.

The control circuit 11 stores information regarding a priority order of connection of multiple profiles in a memory of at least one of the flash memory 8, the RAM 9, or the ROM 10. In the present embodiment, the priority order of connection, in descending order (i.e. from a top priority to lower priorities), is provided as: HFP, AVP, MAP (i.e. a message access profile), PBAP (i.e. a phone book access profile), to DUN.

In addition, the in-vehicle apparatus 1 has a pairing device registration, which is determined in advance, for cellular phones and portable devices. In the pairing device registration, if a cellular phone is equipped with both a hands-free function and an audio function, then hands-free function (i.e. a call function) and the audio function (i.e. a music playback function) in one cellular phone can be arbitrarily/separately set. In addition, if the pairing device is a portable device dedicated for the music playback function, only the audio function is set in the pairing device registration. The pairing device registration may be based on devices that were used or registered during a previous use of the vehicle. In other words, devices that were registered before the in-vehicle apparatus 1 was previously turned off (i.e. power supply was turned off). In the present embodiment, the cellular phone 12, which has an audio function (i.e. a music playback function) to be serving as a portable device (i.e. an AVP type device) besides serving as a cellular phone, is explained as the portable device when the cellular phone 12 is functioning as a portable device (i.e. when it is playing back music).

In a case where the driver, who is getting into the vehicle, carries with him/her the registered cellular phone 12 that has its entry already registered in the pairing device registration at the time of previous turn-off of the power supply for the in-vehicle apparatus 1, the in-vehicle apparatus 1 connects Bluetooth connection to the cellular phone 12, that is, establishes the HFP connection to that cellular phone 12, for enabling the hands-free function. By establishing the HFP connection first, a notification of an incoming call to the cellular phone 12 is given top priority.

When cellular phone 12 receives an incoming call, a notice of the incoming call is provided to the control circuit 11. The control circuit 11 controls the display unit 2 and/or the speaker 5 to display or output a message that notifies the user of the incoming call. For example, the display unit 2 may display information regarding the incoming call, such as a telephone number of the incoming call and the associated name or other attributes that are stored in the flash memory 8. Further, the speaker 5 may provide an output of a ring tone of the incoming call.

After displaying/outputting the above-described message about the incoming call, the control circuit 11 outputs a signal that allows the user to answer the incoming call (i.e. start the call or conversation) based on an off-hook operation on the operation unit 3 by the user. The signal of starting the call is transmitted to the cellular phone 12 through the Bluetooth device 6. When the cellular phone 12 receives this signal to establish a communication channel, and notifies the establishment of the channel to the in-vehicle apparatus 1, the in-vehicle apparatus 1 receiving that notification through the Bluetooth device 6 realizes a telephone call by using the established communication channel.

Additionally, when the user would like to place a call to a certain telephone number, the in-vehicle apparatus 1 receives a signal based on the user operation of the operation unit 3. The in-vehicle apparatus 1, through the Bluetooth device 6, requests the cellular phone 12 to place or initiate a call to the telephone number included in the above signal. The cellular phone 12 places the call to the telephone terminal, and transmits to the in-vehicle apparatus 1 a notification of establishing the call with the telephone terminal. The control circuit 11 receives the communication channel establishment notification through the Bluetooth device 6, and realizes the call to the telephone terminal through the established communication channel.

More practically, when the cellular phone 12 receives a calling voice signal from the telephone terminal (i.e. from a call partner), the signal is transmitted to the in-vehicle apparatus 1. When the control circuit 11 outputs a received calling voice signal to the speaker 5 as a voice signal, the calling voice is output from the speaker 5 toward the user. Further, when the control circuit 11 receives a caller voice signal from a vehicle occupant through the microphone 4, the caller voice signal is transmitted through the Bluetooth device 6 to the cellular phone 12. When the cellular phone 12 receives the caller voice signal, the cellular phone 12 relays and transmits the caller voice signal to the telephone terminal on the call partner side. In such manner, a telephone call by using the in-vehicle apparatus 1 and the cellular phone 12 is realized.

In a situation the cellular phone 12 is registered as a portable device and as a cellular phone at the time of previous turn-off of the power supply for the in-vehicle apparatus 1, the in-vehicle apparatus 1 establishes the SLC to the portable device "in" the cellular phone 12. In other words, after establishing the HFP connection to the cellular phone 12, the in-vehicle apparatus 1 establishes the AVP connection to the same cellular phone 12, because the cellular phone 12 serves as the portable device.

Figure 2:
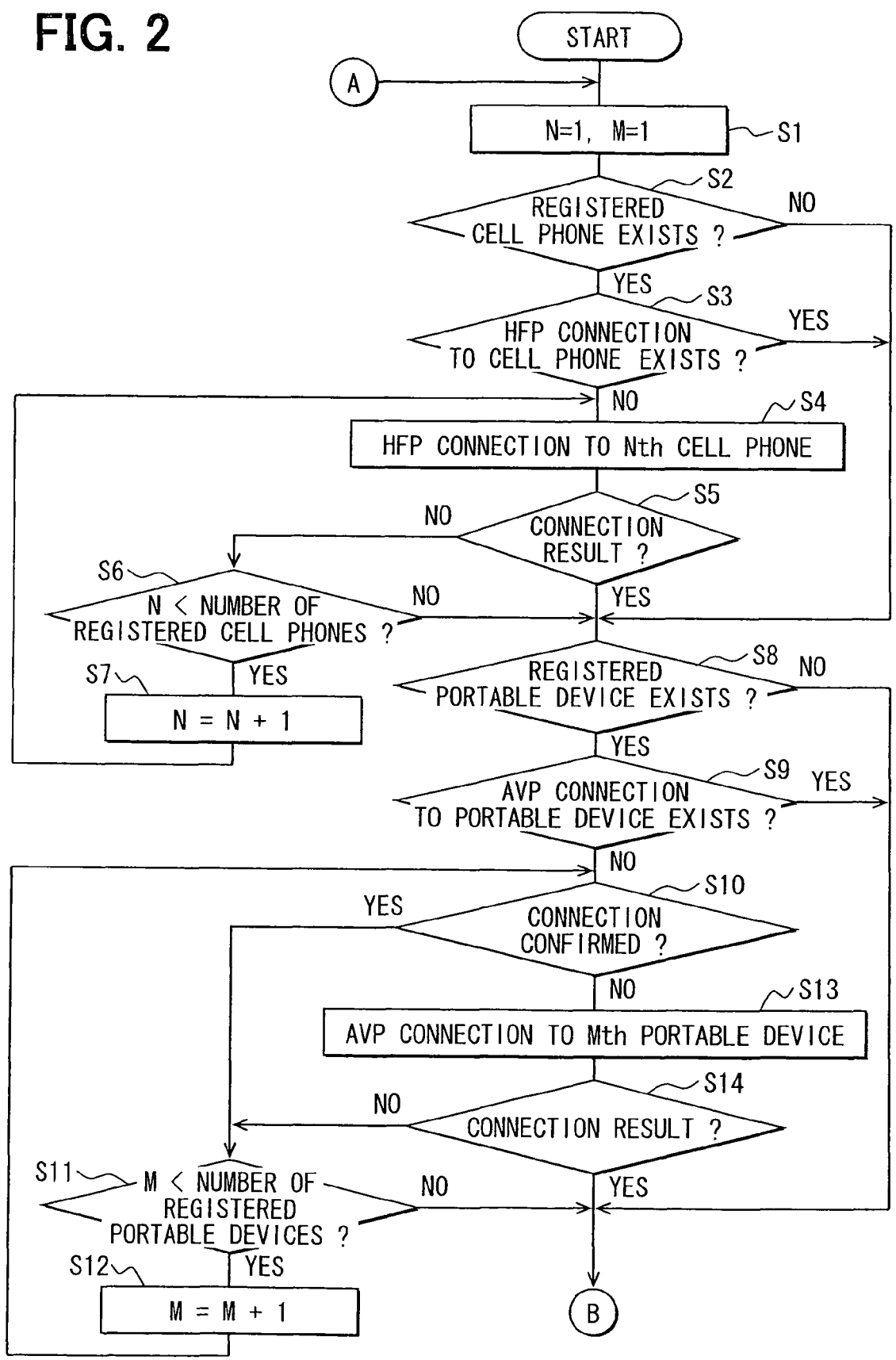
FIG. 2 is a flowchart of a connection operation of the in-vehicle apparatus of FIG. 1.

With further reference to FIGS. 2 and 3, a connection operation (i.e., a connection process) of the control circuit 11 to connect to the cellular phone 12 is shown. The connection operation by the control circuit 11 starts, when an ignition switch is operated and a power supply for accessories in the vehicle is started. In step S1 of the process, the control unit 11 sets a priority order number N of the cellular phone and a priority order number M of the portable device respectively to "1". In step S2, the process determines whether a cellular phone that was connected before the previous power supply was turned off is registered or not. Specifically, the process determines if the cellular phone(s) registered during the previous use of the vehicle are currently available. If a registration of the cellular phone exists (S2:YES), the process, in step S3, determines whether an HFP connection to the registered cellular phone exists. If the in-vehicle apparatus 1 and the cellular phone 12 are not connected by the HFP connection (S3:NO), an HFP connection process to connect to a cellular phone having a priority order number "N" (i.e. the first priority order is connected first) is performed in step S4. The process first establishes a HFP connection to the registered cellular phone that was registered at the time of the previous use of the vehicle (i.e. before the previous power supply was turned off) in order to quickly recover a "pre-disconnection" connection state at the time of the previous power supply turn-off. That is, in other words, a previous operation condition of both the in-vehicle apparatus 1 and the cellular phone 12 is quickly brought back to the user.

After the establishment of the HFP connection in step S4, the process, in step S5, determines if a service level connection (SLC) is connected or available. If the SLC is connected (S5:YES), the process proceeds to step S8, where the process establishes an AVP connection to all of the registered portable devices. If the SLC is not connected (S5:NO), the process proceeds to step S6 to determine whether the number N is smaller than the number of registered cellular phones (S6). If the number N is smaller than the number of registered cellular phones (S6:YES), the number N is incremented by 1 (i.e. N=N+1) in step S7, and the process returns to step S4, to establish a HFP connection to the cellular phone having a priority order number N=N+1. If the SLC is not connected to all of the registered cellular phones 12 (S6:NO), the process proceeds to step S8.

The process in steps S8 to S14, attempts to establish an AVP connection to all of the registered portable devices, as "one round" of connection procedure that is similar to the above-described HFP connection procedure to the registered cellular phones 12. Specifically, if there is a registered portable device (S8:YES) then the process determines if AVP connection is established in step S9. If connection is established (S9:YES) the process moves to step S15. If the connect is not established the process reconfirms the finding in step S10. If the connection is still not confirmed (S10:NO) the process establishes AVP connection to the Mth device. If the connection is established the process moves to step S11 to determine whether the number M is smaller than the number of registered portable devices. If it is smaller (S11:YES) the process moves to increment M (M=M+1) to establish connection to the next portable device. Once all the portable devices have been connected (S11:NO) then the process moves to step S15.

The process of the in-vehicle apparatus 1 proceeds to step S15 to determine whether the in-vehicle apparatus 1 is connected to any cellular phone 12. If the in-vehicle apparatus 1 is connected to a cellular phone 12 by the HFP connection (S15:YES) then the process moves to step S16 to determines if the cell phone has MAP capability. If the in-vehicle apparatus 1 is, at this point, not connected to any cellular phone 12 by the HFP connection (S15:NO), the process moves to step S24. In step S24 the process checks if the pairing device registration includes at least one of the cellular phone or the portable device. If the registration of pairing device does include at least one of the cellular phone (S24:YES), the process returns to step S1 to repeat the above-described procedure (i.e. steps S1-S14).

The process in steps S16 to S23 determine if the cellular phone 12 is capable of different profiles, and attempts to connect the cellular phone 12 to those profiles. Specifically, if the cellular phone 12 is capable of MAP (S16:YES), the process proceeds to step S17 to establish MAP connection between the cell phone and the in-vehicle apparatus 1, and then proceeds to step S18 where it is determined if the cell phone has PBAP capability. If the cellular phone does not have MAP capability (S16:NO) then the process proceeds to step S18. If the cellular phone 12 supports a PBAP (S18: YES), the process, in step S19, establishes PBAP connection. After PBAP connection is established, the process in step S20 transfers a telephone book to the cellular phone 12 (S20). Next, the process, in step S21, determines if the cellular phone 12 supports a DUN. If the process does support DUN (S21:YES), the process, in step S22, establishes a DUN connection, and then performs data communications (S23).

As described above, the in-vehicle apparatus 1 is capable of re-establishing the HFP connection or the AVP connection to the cellular phone 12 that was in connection with the in-vehicle apparatus 1 at the time of previous power supply turn-off. If there are multiple cellular phones or multiple portable devices in the vehicle compartment, a connection to a high-priority device is prioritized among them. Further, if the portable device, which has the AVP connection established to the in-vehicle apparatus 1 at the previous power supply turn-off time, has music pieces stored therein, a music piece being played back at the previous power supply turn-off time is automatically played back again.

Further, if the power supply is turned off, the in-vehicle apparatus 1 registers a currently-connected cellular phone 12 and a currently-connected portable device.

In addition, when none of a cellular phone nor a portable device was registered at the time of the previous power supply turn-off (S2:NO, S8:NO), the process is finished, because there is no HFP connection to the cellular phone (S15:NO) and there is no registration of the cellular phone or the portable device (S24:NO, S25:NO).

In the present embodiment, the profile connection scheme of the in-vehicle apparatus 1 exerts the advantageous effects by assigning a high priority order to a connection of a certain profile from among various kinds of profiles according to a user's requirement or a manufacturer's requirement, for the improvement of usability of the in-vehicle apparatus 1. It is because the in-vehicle apparatus 1 is capable of setting a profile connection priority order for prioritizing a connection of one profile from among various kinds of profiles, when those various kinds of profiles allow connections to multiple device types, such as a portable device and a cellular phone, regardless of what the type of the multiple devices is.

Even when there are multiple devices, a connection of another profile is attempted after a successful connection of one profile, thereby allowing an earlier start of a control by using an arbitrarily-selected profile. More practically, for example, if an HFP connection to a driver's HFP type device is successfully established, another HFP connection to a co-occupant's HFP type device will not continuously be attempted after the establishment of the HFP connection to the driver's HFP type device. That is, a connection attempt to establish other HFP connections to the co-occupant's HFP type device will be cancelled without being tried at all, and an AVP connection to the AVP type device will be attempted. Therefore, in comparison to an operation scheme that attempts to establish the HFP connections to all connectable HFP type devices, the AVP connection to the AVP type device is established at an earlier timing.

When connection operations are repeatedly performed to connect to the registered cellular phones and to the registered portable devices, if an HFP connection has already been established to a cellular phone prior to an AVP connection to a portable device, the control circuit 11 performs one round of AVP connection attempts to all of the registered portable devices according to a priority order, prior to performing connection attempts to connect other data communication type profile to the cellular phone. By using such profile connection scheme, the AVP connection attempt will not be delayed until after the connection attempt of the other data communication type profile, thereby starting music playback at an earlier timing and reducing a waiting time of a user before the starting of music playback by the portable AV player.

Other Embodiments

Although the present disclosure has been fully described in connection with preferred embodiments thereof with reference to the accompanying drawings, it is to be noted that various changes and modifications will become apparent to those skilled in the art.

For example, the present disclosure will be applicable to other HFP type devices that support the HFP connection, that is, will be applicable to the device other than the cellular phone.

Further, the portable device will not be limited to the music player, that is, will include a video player, for example.

Furthermore, a profile is usable in the present disclosure as long as the profile is defined in a category of an Interoperability Profile, such as a File Transfer Profile (FTP), a Head Set Profile (HSP), a Human Interface Profile (HIP), a LAN Access Profile (LAP), an Object Push Profile (OPP), a Personal Networking Profile (PNP), and the like.

Further, the in-vehicle apparatus of the present disclosure may be realized as a vehicle navigation apparatus.

Such changes, modifications, and summarized schemes are to be understood as being within the scope of the present disclosure as defined by appended claims.

What is claimed is:

1. An in-vehicle apparatus which is capable of establishing a Bluetooth connection to pre-registered multiple devices, the apparatus comprising:
    a priority order setting unit that determines an order of priority of a plurality of multiple-device connection profiles of the Bluetooth connection;
    a connection unit that connects the plurality of multiple-device connection profiles to the pre-registered multiple devices according to the order of priority of the plurality of multiple-device connection profiles, wherein the connection unit includes a first sub-unit that performs a connection attempt to establish a connection of a first profile from among the plurality of multiple-device connection profiles to the multiple devices, a second sub-unit that performs a connection attempt to establish a connection of a second profile from among the plurality of multiple-device connection profiles, which is different from the first profile, to the multiple devices, and after successfully establishing a connection of the first profile to a first device from among the multiple devices by the first sub-unit, the connection unit uses the second sub-unit for performing the connection attempt to establish a connection of the second profile to the multiple devices, without continuing to perform a connection attempt by the first sub-unit; and
    a connection operation controller, wherein
    the first sub-unit establishes an HFP connection to an HFP type device to put the HFP type device in a call waiting condition,
    the second sub-unit establishes an AVP connection to an AVP type device to enable a playback by the AVP type device,
    the connection unit includes a third sub-unit for connecting a data communication type profile to the HFP type device, and
    when the first sub-unit is connected prior to the connection of the second sub-unit after repeated operations of the first and second sub-units, the connection operation controller operates the second sub-unit before operating the third sub-unit.

2. The in-vehicle apparatus of claim 1 further includes:
    a registration unit that stores a registration of a device that is connected to the connection operation controller at a time of previous power supply turn-off, wherein
    the connection operation controller prioritizes the Bluetooth connection of the device that has the registration in the registration unit when the connection operation controller operates the second sub-unit.

3. The in-vehicle apparatus of claim 1, wherein the HFP type device is a cellular phone.

4. The in-vehicle apparatus of claim 1, wherein the AVP type device is a portable music player dedicated for playback of a music AV data.

5. The in-vehicle apparatus of claim 1, wherein the connection to multiple devices is in parallel.

* * * * *